Aug. 11, 1925.                                        1,549,385
G. W. RYAN
AUTO LOCK
Filed April 27, 1921        2 Sheets-Sheet 2
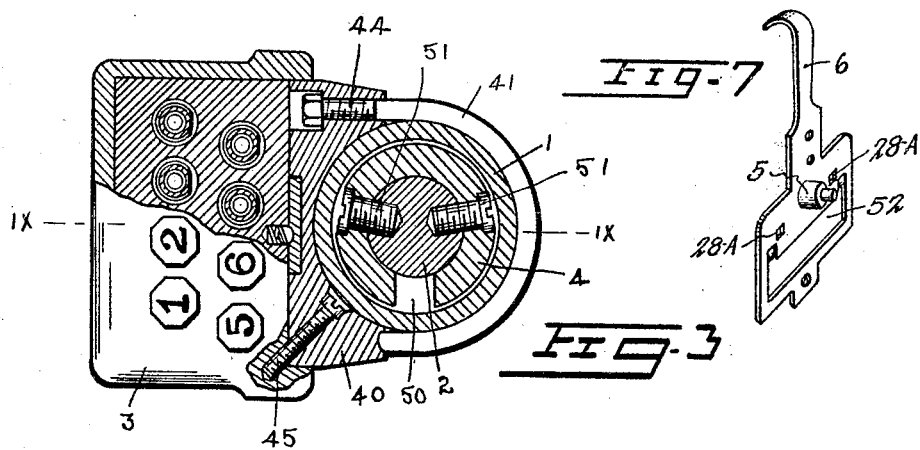
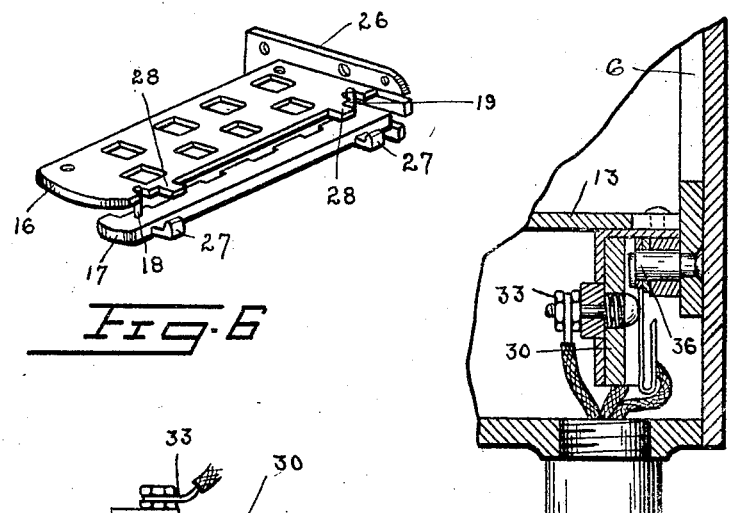
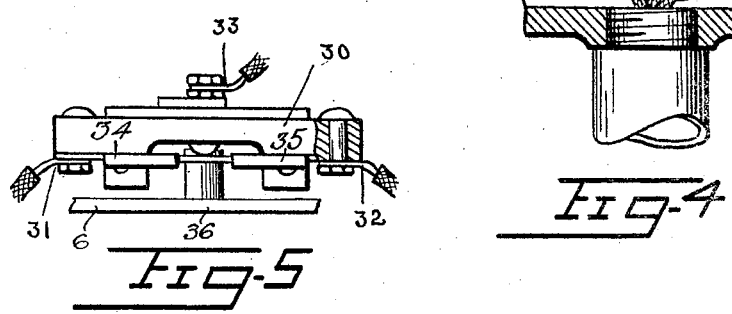
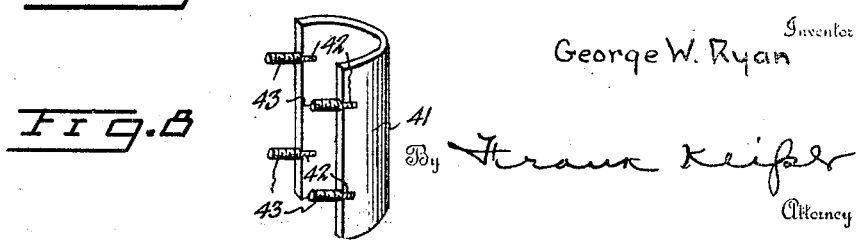
Inventor
George W. Ryan
By Frank Keifer
Attorney Patented Aug. 11, 1925.

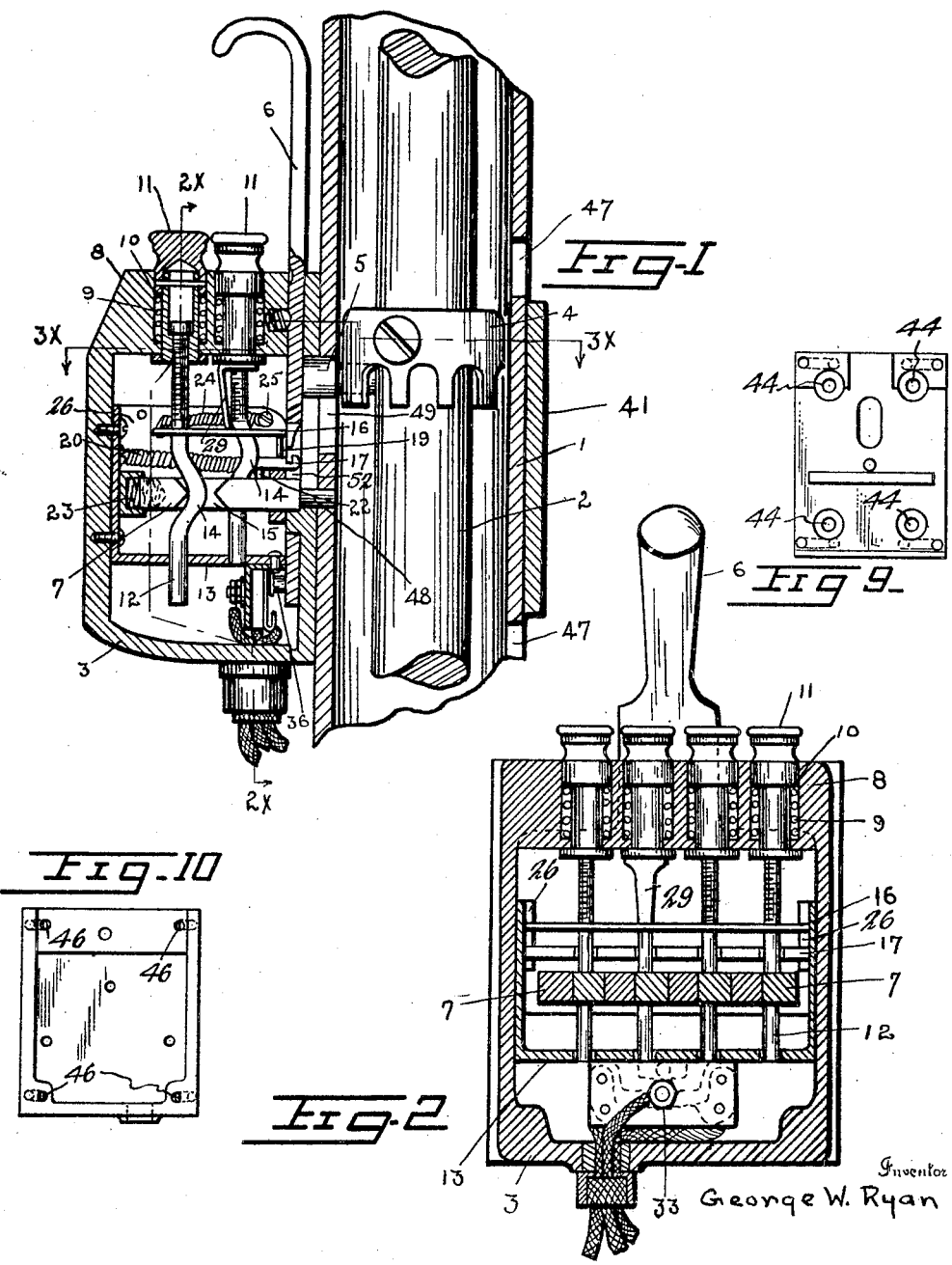

1,549,385

UNITED STATES PATENT OFFICE.

GEORGE W. RYAN, OF CORNING, NEW YORK, ASSIGNOR TO ROCHESTER LOCK CORPORATION, OF ROCHESTER, NEW YORK, A CORPORATION OF NEW YORK.

AUTO LOCK.

Application filed April 27, 1921. Serial No. 464,888.

*To all whom it may concern:*

Be it known that I, GEORGE W. RYAN, a citizen of the United States, residing at Corning, in the county of Steuben and State of New York, have invented certain new and useful Improvements in Auto Locks, of which the following is a specification.

The object of this invention is to provide a new improved form of lock for automobiles, said lock being a combination lock and being adapted to lock the steering wheel of the automobile.

This and other objects of this invention will be fully illustrated in the drawings, described in the specification and pointed out in the claims at the end thereof.

In the drawings:

Figure 1 is a vertical section thru the lock and steering post the section being taken on the line 1ˣ and 1ˣ of Figure 3.

Figure 2 is a section on the line 2ˣ 2ˣ of Figure 1.

Figure 3 is a horizontal section on the line 3ˣ 3ˣ of Figure 1.

Figure 4 is an enlarged detailed view of the switch connections.

Figure 5 is a bottom plan view of the switch.

Figure 6 is a perspective view of the locking plates.

Figure 7 is a perspective view of the latch plate.

Figure 8 is a perspective view of the shell forming part of the clamp on the steering column.

Figure 9 is an elevation of the base of the casting that is interposed between the lock and the steering column.

Figure 10 is an elevation of the base of the lock by which it is fastened to the clamp on the steering column.

In the several figures of the drawing like reference numerals indicate like parts.

In the drawings, reference 1 represents the fixed standard or steering column of an automobile steering mechanism within which a steering post is provided. On the steering column is provided the auto lock 3 which forms the subject matter of this invention. Fastened rigidly to the steering post 2 is a locking collar 4. Carried on the auto lock is a latch bolt 5 adapted to be moved into engagement with any one of a plurality of recesses in the collar 4 to prevent the turning of the collar and this in turn will prevent the turning of the steering post 2 and the steering wheel. The movement of the latch bolt 5 is secured through the latch plate 6 on which it is mounted and with which it is adapted to move to the limit shown in Figure 1 when the sliding bolts 7 to be hereinafter more particularly described are withdrawn, it being understood that in Figure 1 the latch plate 6, the latch bolt 5 and the sliding bolts 7 are shown in locking position. The latch plate moves down from the position shown in Figure 1, carrying the bolt 5 with it and out of engagement with the collar 4 and permitting the rotation of the collar. While the latch plate 6 is in the raised position shown in Figure 1 it is held in said position by a locking mechanism which I will now describe.

In the lock eight keys 11 are shown arranged in two parallel rows. These keys are numbered as indicated on the keyboard in Figure 3 from one to eight inclusive, the keys of one row being staggered in relation to the keys of the other row. Each of these keys moves in a socket in the key plate or top wall 8 of the lock. Each of these sockets is provided with a spring 9 which engages under a shoulder 10 on the key and by means of which the key is normally held in raised position. When the key is pushed in the spring is compressed. When the driver's fingers are removed from the keys the springs 9 will restore the keys to their normal position.

Threaded into each key is a stem 12 the upper end of which is threaded into the key for the purpose of adjusting the stem so as to project the desired distance from the key. These stems are guided at the bottom by a guide plate 13. Below its threaded portion each of the stems is bent to form a cam 14 thereon which cam is adapted to engage in a cam slot 15 in one of the bolts 7. These cams normally trend uniformly in the same direction and they can be raised or lowered with reference to the recesses in the bolts by screwing the stems on which they are formed up or down in the keys 11. As shown in Figure 1 one of the cams 14 is shown directly engaged in its co-acting bolt 7 and the other cam 14 is shown raised out of engagement with its co-acting bolt 7. When the key 11 shown to the left in Fig. 1 is pushed down, its co-acting bolt 7 will be moved to the left and out of the path of the latch plate. When the key 11 to the right of Figure 1 is pushed in, its co-acting bolt 7 will be moved to the right and into the path of the latch plate.

It will thus be seen that the latch plate 6 is controlled by the bolts 7, which in turn are controlled by the keys 11 and cams 14 according to any combination in which the cams and locking bolts 7 may be arranged.

The latch plate 6 is also controlled by the superposed plates 16 and 17 shown in Figure 6, which may be termed lock plates. The upper lock plate 16 is provided with eight openings therein, each of which is adapted to receive one of the stems 12 with clearance enough to give the plate an independent locking movement. The lower lock plate 17 is a narrow plate and has four recesses therein which act as clearances for the cams 14 as they move up and down so that the cams of the innermost row of keys will not touch the plate 17. On the lock plate 17 are mounted the pins 18 and 19 which engage in suitable recesses in lock plate 16. The lock plate 16 is moved to the left or backward by the pins 18 and 19 when the lock plate 17 is moved to the left by the spring 20. The lock plate 17 is normally held in the position shown in Figure 1 by the pins 22 carried on the bolts 7. These bolts are moved to the left, as viewed in Fig. 1, by their co-acting cams 14 and are normally pressed toward the right by the springs 23, one of which springs is provided for each locking bolt.

The lock plate 16 is drawn to the right by the spring 24 fastened to the frame of the lock at 25. This spring moves the lock plate 16 to the right as viewed in Figures 1 and 6 while the spring 20 moves said plate to the left through the medium of the lock plate 17. The spring 20 is stronger than spring 24 so that when the lock plate 17 is fully released, the lock plates 16 and 17 will move to the left simultaneously.

The lock plates 16 and 17 are mounted to slide horizontally in guide slots provided in the plates 26, one of which is provided at each end of the lock plates.

On the forward edge of the lock plate 17 are provided the two dogs 27 which extend forwardly and upwardly with a hook shape and these dogs extend through an opening 52 provided in the latch plate 6 so as to arrest the downward movement of the latch plate after being slightly depressed and until all the bolts 7 in the selected combination have been withdrawn by their co-acting keys 11. The lock plate 16 is provided on the forward edge with the dogs 28 which normally rest against the inside of the latch plate 6 and in that position perform no useful function.

When the keys 11 are pressed according to the combination of the lock the bolts 7 in the combination are withdrawn and at the same time the spring 20 acts to withdraw the lock plate 17 so that the hook-shaped dogs thereof move out of the path of the latch plate so as to allow said latch plate to be lowered. The withdrawal of the lock plate 17 is permitted by reason of the pins 22 on the bolts 17 of the selected combination moving out of contact with said lock plate, during which action the spring 20 draws said lock plate to the left in Fig. 1 and permits the latch plate to be pressed down. If, however, the keys 11 are depressed otherwise than in accordance with the selected combination at which the lock is set, the hooked-shaped dogs of the lock plate 17 will be retained in the path of the latch plate, and in attempting to move the latch plate downwardly, it will come in contact with said dogs and be arrested thereby. While the latch plate 6 is held in this position the lock plate 16 is free to move forward due to the fact that the openings 28$^A$ are in front of the dogs 28 and the dogs 28 can engage therein. Said lock plate 16 will be moved forward by the action of the spring 24 and this will push the dogs 28 into the openings 28$^A$ and lock the latch plate in an intermediate position in locking engagement with the plate 17 so that it cannot thereafter be released by merely pressing the correct combination of keys. If the correct combination of keys is pressed the plate 16 will remain locked to the plate 6 because the plate 6 is held down in engagement therewith by the plate 16. The latch plate can only be released from the lock plate 16 by the use of one of the keys 11, the stem of which is provided with a cam 29. This cam is locked on the thread of the stem in any suitable manner so that it cannot turn thereon but will move up or down therewith. This key, which may be termed the master key, will not be included in the combination in any event, but will be used solely for the purpose of withdrawing the plate 16 if it has moved into locking engagement with the latch plate 6 as above described. The cam 29 is moved down into engagement with the plate 16 by turning said master key 11 on the stem 12 and this causes the stem to move down and carry the cam with it. In order to accomplish this it is understood that the cam 29 is so positioned that the master key, and the stem co-acting therewith, may be depressed in the same manner as the other keys 11 and their co-acting stems without causing said cam to shift the lock plate 16, as the depressing of the master key having the cam 29 thereon may often occur during the attempt to surreptitiously unlock the latch plate, but when actuating the cam to unlock the latch plate by turning the master key on the stem carrying said cam, said stem will be lowered to a greater extent than can occur by the mere depression of said master key. Consequently, the lock plate 16 is moved to unlocking position by special manipulation. The lock plate 16 is moved toward the left from the position shown in Fig. 1, or into unlocking position, by the cam 29 against the action of the spring 24, which latter tends to move said lock plate toward the right or into locking position, and by reason of the pins 18, 19 on the lock plate 17 engaging the forward edge of the lock plate 16, said lock plate 17 is moved into locking position by said lock plate 16 against the action of the spring 20. Therefore, when the lock plate 16 is moved toward the left from the position shown in Fig. 1, or into unlocking position, the pins 18, 19 are released and the lock plate 17 is drawn into unlocking position by said spring 20. A special socket wrench is used on the master key 11 for this purpose and the same socket wrench will be used on the remaining keys for the purpose of raising or lowering the cams 14 for the combination desired. It will also be understood that the stem 12 of some of the keys will be provided with right hand threads and the stems of the remaining keys will be provided with left hand threads so that only a person that is familiar with the lock can use the wrench properly. The right and left hand threads will be distributed differently in different locks, to vary the combination.

In the bottom of the lock is provided the contact block 30 which is made of insulating material. On this block are provided the binding posts 31 and 32 to which the leads of the ignition circuit are connected and the binding post 33 to which the lead of the alarm circuit is connected. The binding posts 31 and 32 connect with plates 34 and 35 into contact with which is moved a stud 36 carried on the latch plate when the latch plate is moved down. This closes the ignition circuit so that the current flows from the plate 35 to the plate 34 from the one binding post to the other. When the latch plate moves up and stops in the position shown in Figure 1, the alarm circuit will not be closed, but when the latch plate moves down to the intermediate position and is there retained because of improper manipulation of the keys 11, electrical connection is made and maintained between the stud 36 and binding post 33, and an alarm sounded to notify those within hearing that an attempt is being made to steal the car. This alarm will continue until the latch plate is released by the owner, authorized operator, or someone in possession of the combination at which the lock is set. As the stud 36 moves up or down with the latch plate 6 moving through a full movement it passes the alarm contact and closes the circuit for the moment with but little or no effect on the alarm, but when the latch plate is caught between the two locking plates 16 and 17 the alarm will ring continuously.

The lock is fastened to the steering post in the manner that will now be described. A base 40 is provided, which has a flat seat on one side to receive the lock and a concave seat on the other side to fit the steering column. Cooperating with the base is the concave shell 41 which is recessed at four places 42 to receive the studs 43 which make a drive fit with the recesses and are then fastened thereto by welding. The base is tapped at four places 44—44 to receive the studs 43, the studs being fastened in the base by nuts. After the shell 41 is fastened in place the lock is fastened to the base by means of the diagonal screws 45 which pass thru openings 46 in the base and in the lock case.

The lock is assembled on the steering column as follows: The steering column is removed from the machine and is tapped with openings in line with the heads of the screws 45 so that a screw driver can be passed thru said openings to reach the heads of the screws. On the opposite side the steering column is provided with openings 47 through which the screw driver can be inserted to reach either of the two screws 45 at the one end. The shell 41 is also provided with similar openings at these points. The steering column is also provided with an opening to receive the centering pin 48 with which it makes a close fit and an elongated opening 49 to receive the bolt 5 and permit it to connect with the collar 4. The collar 4 is slotted as indicated at 50 to permit the bolt 5 to pass through, when the column is replaced on the steering post. The collar 4 is fastened to the steering post by the screws 51. The collar 4 is first fastened on the steering post. The steering column is then perforated with eight openings as above described. The base of the lock and the shell 41 are then clamped in place on the steering column and the nuts on the studs 44 are then tightened up. The lock is then put in place and fastened in position by the screws 45. The steering column is then placed over the steering post and the bolt 5 is passed below the locking collar 4 with the latch plate 6 in its lowest position after which the steering and other parts can be put in place and the lock is then ready for use.

I claim:

1. In an auto lock, the combination of a reciprocable latch plate normally in unlocked position, a plurality of bolts reciprocably mounted to move at right angles to said latch plate, a lock plate normally held out of the path of said latch plate, a second lock plate, means for actuating said bolts to move the same out of normal position and thereby cause said first-mentioned lock plate to be moved into the path of said latch plate when said latch plate is moved into locking position, and means for moving said second lock plate into locking engagement with said latch plate before said first-mentioned lock plate is withdrawn from its position in the path of said latch plate.

2. In an auto lock, the combination of a latch element, a plurality of bolts, and a pair of lock plates above said bolts, all normally in unlocking position to permit movement of said latch plate from unlocking to locking position, means for actuating said bolts to move the same into locking position, means on said bolts to move one of said lock plates into locking position to arrest said latch plate during the initial portion of its movement from locking to unlocking position, and means to cause the other lock plate to move and lock said latch plate when said latch plate is arrested by said first-mentioned lock plate.

3. In an auto lock, the combination of a latch plate, locking mechanism normally permitting movement of said latch plate from unlocking to locking position, one part of said locking mechanism serving to arrest said latch plate when moving the same from locking to unlocking position, a second part of said locking mechanism being adapted to engage said latch plate and lock the same when arrested by the first-mentioned part of said mechanism, and a third part of said locking mechanism including a plurality of individually movable elements adapted to be selectively operated and controlling the movement of the first part of said mechanism.

4. In an auto lock, the combination of a latch plate, a plurality of bolts movably mounted to assume a locking or unlocking position, a lock plate adapted to assume a locking or unlocking position and being moved from unlocking position to locking position by said bolts, means to move said lock plate from locking position to unlocking position when released by said bolts, a second lock plate movable into unlocking or locking position, means tending to move said second lock plate into locking position, means on said first-mentioned lock plate to move said second lock plate into unlocking position during the movement of said first-mentioned lock plate into unlocking position, and a plurality of keys selectively manipulated to control said lock plates through the medium of said bolts to permit the desired manipulation of said latch plate.

5. In an auto lock, the combination of a latch plate, a plurality of slidable bolts co-acting therewith, keys engaging said bolts for controlling the movement thereof into or out of locking position, two lock plates co-acting to first arrest the movement of said latch plate from locking to unlocking position and then lock said latch plate in arrested position, said lock plates being movable in two directions and being controlled in their movement in one direction by said keys through the medium of said bolts, and means to move said lock plates in the opposite direction when released from control of said bolts.

6. In an auto lock, a series of manipulating keys including a master key, a latch element adapted to lock another element and being freely movable from unlocking to locking position, locking means for locking said latch element against complete movement from locking to unlocking position, said locking means being controlled by said keys, proper selective manipulation of said keys permitting movement of said latch element from locking to unlocking position and improper selective manipulation of said keys preventing unlocking of said latch element except through the manipulation of said master key.

7. In an auto lock, the combination of a latch plate, a plurality of bolts, means for mounting said bolts for movement into or out of the path of said latch plate, a first locking plate, means including, at least, one of the locking bolts for holding said locking plate in position to be engaged by said latch plate and retracting it therefrom, a second locking plate, means for normally holding said second locking plate against the latch plate and for moving it into locking engagement with the latch plate when the latter is moved into engagement with the first named locking plate.

In testimony whereof I affix my signature.

GEORGE W. RYAN.